(12) United States Patent
Kadous (10) Patent No.: US 7,508,748 B2
(45) Date of Patent: *Mar. 24, 2009

(54) RATE SELECTION FOR A MULTI-CARRIER MIMO SYSTEM

(75) Inventor: Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 674 days.

This patent is subject to a terminal disclaimer.

(21) Appl. No.: 10/778,570

(22) Filed: Feb. 13, 2004

(65) Prior Publication Data

US 2005/0088959 A1 Apr. 28, 2005

Related U.S. Application Data

(60) Provisional application No. 60/514,402, filed on Oct. 24, 2003.

(51) Int. Cl.
  *H04J 11/00* (2006.01)
(52) U.S. Cl. .................. 370/208; 370/252; 375/144
(58) Field of Classification Search ........... 370/208, 370/203, 252, 253, 210, 343, 470, 471, 337, 370/347, 349, 428; 375/144, 267, 148, 261, 375/298, 299, 346, 347; 455/67.13, 452, 455/226.3, 423, 450, 67, 13, 226

See application file for complete search history.

(56) References Cited

U.S. PATENT DOCUMENTS 6,141,317 A  10/2000  Marchok et al. ............ 370/208

(Continued)

FOREIGN PATENT DOCUMENTS

WO     9729584     8/1997

(Continued)

OTHER PUBLICATIONS

Ka-Wai Ng et al, A Simplified Bit Allocation for V-Blast based OFDM MIMO Systems in Frequency Selective Fading Channels, Apr. 28, 2002.

(Continued)

*Primary Examiner*—Chi H Pham
*Assistant Examiner*—Alexander Boakye
(74) *Attorney, Agent, or Firm*—Sandip S. Minhas; James K. O'Hare; Thomas R. Rouse (57) ABSTRACT

To select a rate for data transmission in a multi-carrier MIMO system with a multipath MIMO channel, a post-detection SNR $SNR_l(k)$ for each subband k of each spatial channel l is initially determined and used to derive a constrained spectral efficiency $S_l(k)$ based on a constrained spectral efficiency function $f_{siso}(SNR_l(k), M)$ of SNR and modulation scheme M. An average constrained spectral efficiency $S_{avg}$ for all subbands of all spatial channels used for data transmission is next determined based on the constrained spectral efficiencies for the individual subbands/spatial channels. An equivalent SNR needed by an equivalent system with an AWGN channel to support a data rate of $S_{avg}$ is determined based on an inverse constrained spectral efficiency function $f_{siso}^{-1}(S_{avg}, M)$. A rate is selected for the multi-carrier MIMO system based on the equivalent SNR. The selected rate is the highest rate among all supported rates with a required SNR less than or equal to the equivalent SNR.

29 Claims, 8 Drawing Sheets

U.S. PATENT DOCUMENTS

| | | | |
|---|---|---|---|
| 7,012,883 B2 * | 3/2006 | Jalali et al. | 370/208 |
| 7,076,263 B2 * | 7/2006 | Medvedev et al. | 455/522 |
| 7,154,936 B2 * | 12/2006 | Bjerke et al. | 375/148 |
| 7,164,649 B2 * | 1/2007 | Walton et al. | 370/203 |
| 7,197,084 B2 * | 3/2007 | Ketchum et al. | 375/296 |
| 7,366,462 B2 | 4/2008 | Murali et al. | |
| 2003/0125040 A1 | 7/2003 | Walton | |
| 2005/0122928 A1 | 6/2005 | Vijaya et al. | |
| 2005/0135308 A1 | 6/2005 | Vijaya et al. | |
| 2005/0141475 A1 | 6/2005 | Vijaya et al. | |

FOREIGN PATENT DOCUMENTS

| | | |
|---|---|---|
| WO | 03047197 | 6/2003 |
| WO | WO 03/047198 A2 | 6/2003 |
| WO | WO 03/075479 A1 | 9/2003 |

OTHER PUBLICATIONS

International Search Report-PCT/US04/033680, Search Authority-European Patent Office-Feb. 17, 2005.

T.L. Marzetta et al., "Structured Unitary Space-Time Autocoding Contellations," IEEE Transaction on Information Theory, vol. 48, No. 4, Apr. 2002.

* cited by examiner

R = rate
M = modulation scheme
C = coding scheme
$P_e$ = probability of error
$\ell$ = index for spatial channels
k = index for subbands
S = spectral efficiency

RATE SELECTION FOR A MULTI-CARRIER MIMO SYSTEM

CROSS-REFERENCE TO RELATED APPLICATION

This application claims the benefit of U.S. Provisional Patent Application Ser. No. 60/514,402, filed Oct. 24, 2003, which is incorporated herein by reference in their entirety.

FIELD

The present invention relates generally to communication, and more specifically to techniques for performing rate selection for data transmission in a multi-carrier multiple-input multiple-output (MIMO) communication system.

BACKGROUND

A MIMO system employs multiple ($N_T$) transmit antennas at a transmitter and multiple ($N_R$) receive antennas at a receiver for data transmission. A MIMO channel formed by the $N_T$ transmit antennas and $N_R$ receive antennas may be decomposed into $N_S$ spatial channels, where $N_S \leq \min\{N_T, N_R\}$. The $N_S$ spatial channels may be used to transmit data in parallel to achieve higher throughput and/or redundantly to achieve greater reliability.

Orthogonal frequency division multiplexing (OFDM) is a multi-carrier modulation scheme that effectively partitions the overall system bandwidth into multiple ($N_F$) orthogonal subbands. These subbands are also referred to as tones, sub-carriers, bins, and frequency channels. With OFDM, each subband is associated with a respective subcarrier that may be modulated with data.

For a MIMO system that utilizes OFDM (i.e., a MIMO-OFDM system), $N_F$ subbands are available on each of the $N_S$ spatial channels for data transmission. The $N_F$ subbands of each spatial channel may experience different channel conditions (e.g., different fading, multipath, and interference effects) and may achieve different channel gains and signal-to-noise-and-interference ratios (SNRs). Depending on the multipath profile of the MIMO channel, the channel gains and SNRs may vary widely across the $N_F$ subbands of each spatial channel and may further vary widely among the $N_S$ spatial channels.

For the MIMO-OFDM system, one modulation symbol may be transmitted on each subband of each spatial channel, and up to $N_F \cdot N_S$ modulation symbols may be transmitted simultaneously in each OFDM symbol period. Each transmitted modulation symbol is distorted by the channel gain for the subband of the spatial channel via which the symbol is transmitted and further degraded by channel noise and interference. For a multipath MIMO channel, which is a MIMO channel with a frequency response that is not flat, the number of information bits that may be reliably transmitted on each subband of each spatial channel may vary from subband to subband and from spatial channel to spatial channel. The different transmission capabilities of the different subbands and spatial channels plus the time-variant nature of the MIMO channel make it challenging to ascertain the true transmission capacity of the MIMO-OFDM system.

There is therefore a need in the art for techniques to accurately determine the transmission capacity of the MIMO-OFDM system for efficient data transmission.

SUMMARY

Techniques for performing rate selection in a multi-carrier MIMO system (e.g., a MIMO-OFDM system) with a multipath MIMO channel are described herein. In an embodiment, a post-detection SNR, $SNR_l(k)$, for each subband k of each spatial channel l used for data transmission is initially determined for a "theoretical" multi-carrier MIMO system that is capable of achieving capacity of the MIMO channel. The post-detection SNR is the SNR after spatial processing or detection at a receiver. The theoretical system has no implementation losses. A constrained spectral efficiency $S_l(k)$ for each subband of each spatial channel is then determined based on its post-detection SNR, a modulation scheme M, and a constrained spectral efficiency function $f_{siso}(SNR_l(k), M)$. An average constrained spectral efficiency $S_{avg}$ for all subbands of all spatial channels used for data transmission is next determined based on the constrained spectral efficiencies for the individual subbands of the spatial channels.

An equivalent system with an additive white Gaussian noise (AWGN) channel needs an SNR of $SNR_{equiv}$ to achieve a constrained spectral efficiency of $S_{avg}$ with modulation scheme M. An AWGN channel is a channel with a flat frequency response. The equivalent system also has no implementation losses. The equivalent SNR may be determined based on an inverse constrained spectral efficiency function $f_{siso}^{-1}(S_{avg}, M)$. A rate R is then selected for data transmission in the multi-carrier MIMO system based on the equivalent SNR. The multi-carrier MIMO system may support a specific set of rates, and the required SNRs for these rates may be determined and stored in a look-up table. The selected rate is the highest rate among the supported rates with a required SNR that is less than or equal to the equivalent SNR. A back-off factor may be computed to account for error in the rate prediction, system losses, and so on. The rate R may then be selected in a manner to account for the back-off factor, as described below.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The rate selection techniques described herein may be used for various types of multi-carrier MIMO system. For clarity, these techniques are specifically described for a MIMO-OFDM system.

Figure 1:
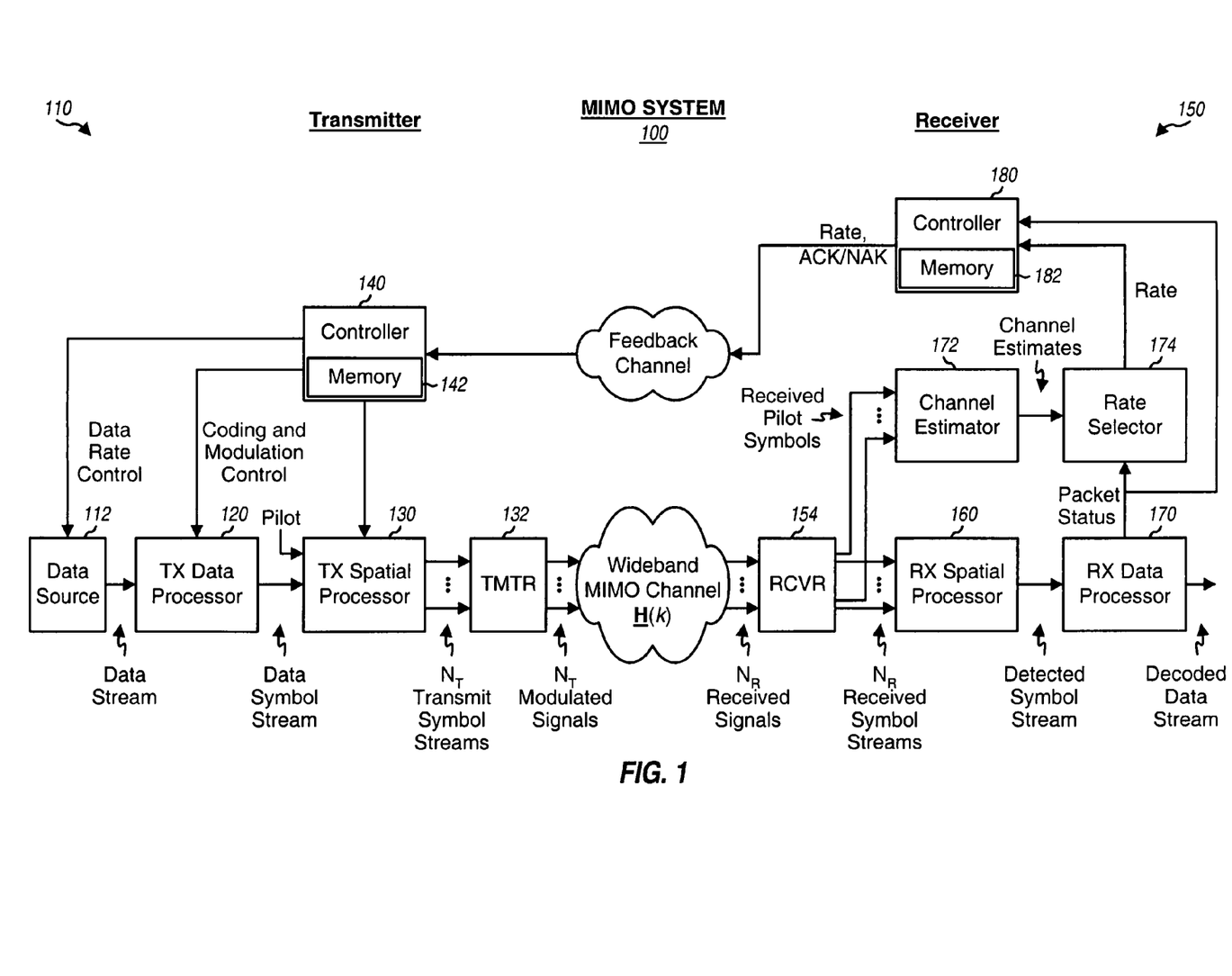
FIG. 1 shows a transmitter and a receiver in a MIMO-OFDM system.

FIG. 1 shows a block diagram of a transmitter 110 and a receiver 150 in a MIMO-OFDM system 100. At transmitter 110, a transmit (TX) data processor 120 receives packets of data from a data source 112. TX data processor 120 encodes, interleaves, and modulates each data packet in accordance with a rate selected for that packet to obtain a corresponding block of data symbols. As used herein, a data symbol is a modulation symbol for data, and a pilot symbol is a modulation symbol for pilot, which is known a priori by both the transmitter and receiver. The selected rate for each data packet may indicate the data rate, coding scheme or code rate, modulation scheme, packet size, and so on for that packet, which are indicated by various controls provided by a controller 140.

A TX spatial processor 130 receives and spatially processes each data symbol block for transmission on the $N_F$ subbands of the NT transmit antennas. TX spatial processor 130 further multiplexes in pilot symbols and provides NT streams of transmit symbols to a transmitter unit (TMTR) 132. Each transmit symbol may be for a data symbol or a pilot symbol. Transmitter unit 132 performs OFDM modulation on the NT transmit symbol streams to obtain NT OFDM symbol streams and further processes these OFDM symbol streams to generate NT modulated signals. Each modulated signal is transmitted from a respective transmit antenna (not shown in FIG. 1) and via a MIMO channel to receiver 150. The MIMO channel distorts the NT transmitted signals with a MIMO channel response and further degrades the transmitted signals with noise and possibly interference from other transmitters.

At receiver 150, the $N_T$ transmitted signals are received by each of $N_R$ receive antennas (not shown in FIG. 1), and the $N_R$ received signals from the $N_R$ receive antennas are provided to a receiver unit (RCVR) 154. Receiver unit 154 conditions and digitizes each received signal to obtain a corresponding stream of samples and further performs OFDM demodulation on each sample stream to obtain a stream of received symbols. Receiver unit 154 provides $N_R$ received symbol streams (for data) to an RX spatial processor 160 and received pilot symbols (for pilot) to a channel estimator 172. RX spatial processor 160 spatially processes or detects the $N_R$ received symbol streams to obtain detected symbols, which are estimates of the data symbols transmitted by transmitter 110.

An RX data processor 170 receives, demodulates, deinterleaves, and decodes each block of detected symbols in accordance with its selected rate to obtain a corresponding decoded packet, which is an estimate of the data packet sent by transmitter 110. RX data processor 170 also provides the status of each decoded packet, which indicates whether the packet is decoded correctly or in error.

Channel estimator 172 processes the received pilot symbols and/or received data symbols to obtain channel estimates for the MIMO channel. The channel estimates may include channel gain estimates, SNR estimates, and so on. A rate selector 174 receives the channel estimates and selects a suitable rate for data transmission to receiver 150. A controller 180 receives the selected rate from rate selector 174 and the packet status from RX data processor 170 and assembles feedback information for transmitter 110. The feedback information may include the selected rate, acknowledgments (ACKs) or negative acknowledgments (NAKs) for current and/or prior data packets, and so on. The feedback information is processed and transmitted via a feedback channel to transmitter 110.

At transmitter 110, the signal(s) transmitted by receiver 150 are received and processed to recover the feedback information sent by receiver 150. Controller 140 receives the recovered feedback information, uses the selected rate to process subsequent data packets to be sent to receiver 150, and uses the ACKs/NAKs to control retransmission of the current and/or prior data packets.

Controllers 140 and 180 direct the operation at transmitter 110 and receiver 150, respectively. Memory units 142 and 182 provide storage for program codes and data used by controllers 140 and 180, respectively. Memory units 142 and 182 may be internal to controllers 140 and 180, as shown in FIG. 1, or external to these controllers.

A major challenge for the MIMO-OFDM system is selecting a suitable rate for data transmission based on channel conditions. The goal of the rate selection is to maximize throughput on the $N_S$ spatial channels while meeting certain quality objectives, which may be quantified by a particular packet error rate (e.g., 1% PER).

The performance of the MIMO-OFDM system is highly dependent on the accuracy of the rate selection. If the selected rate for data transmission is too conservative, then excessive system resources are expended for the data transmission and channel capacity is underutilized. Conversely, if the selected rate is too aggressive, then the receiver may decode the data transmission in error and system resources may be expended for retransmission. Rate selection for the MIMO-OFDM system is challenging because of the complexity in estimating the true transmission capability of a multipath MIMO channel.

A multipath MIMO channel formed by the $N_T$ transmit antennas at transmitter 110 and the $N_R$ receive antennas at receiver 150 may be characterized by a set of $N_F$ channel response matrices H(k), for k=1 . . . $N_F$, which may be expressed as:

$$\underline{H}(k) = \begin{bmatrix} h_{1,1}(k) & h_{1,2}(k) & \cdots & h_{1,N_T}(k) \\ h_{2,1}(k) & h_{2,2}(k) & \cdots & h_{2,N_T}(k) \\ \vdots & \vdots & \ddots & \vdots \\ h_{N_R,1}(k) & h_{N_R,2}(k) & \cdots & h_{N_R,N_T}(k) \end{bmatrix}, \quad \text{Eq (1)}$$

for k = 1 ... $N_F$, where entry $h_{i,j}(k)$, for i=1 . . . $N_R$, j=1 . . . $N_T$, and k=1 . . . $N_F$, denotes the complex channel gain between transmit antenna j and receive antenna i for subband k. For simplicity, the following description assumes that each channel response matrix H(k) is full rank and the number of spatial channels is $N_S=N_T \leq N_R$. In general, a spatial channel is an effective channel between an element of a data symbol vector s(k) at the transmitter and a corresponding element of a detected symbol vector ŝ(k) at the receiver. The vectors s(k) and ŝ(k) are described below. The $N_T$ spatial channels of the MIMO channel are dependent on the spatial processing (if any) performed at the transmitter and the spatial processing performed at the receiver.

The multipath MIMO channel has a capacity that can be determined in various manners. As used herein, "capacity"

denotes the transmission capability of a channel, and "spectral efficiency" denotes the general concept of "capacity per dimension", where the dimension may be frequency and/or space. Spectral efficiency may be given in units of bits per second per Hertz per spatial channel (bps/Hz/ch) for the MIMO-OFDM system. Spectral efficiency is often specified as being either constrained or unconstrained. An "unconstrained" spectral efficiency is typically defined as the theoretical maximum data rate that may be reliably used for a channel with a given channel response and noise variance. A "constrained" spectral efficiency is further dependent on the specific modulation scheme used for data transmission. The constrained capacity (due to the fact that modulation symbols are restricted to specific points on a signal constellation) is lower than the unconstrained capacity (which is not confined by any signal constellation).

Figure 2:
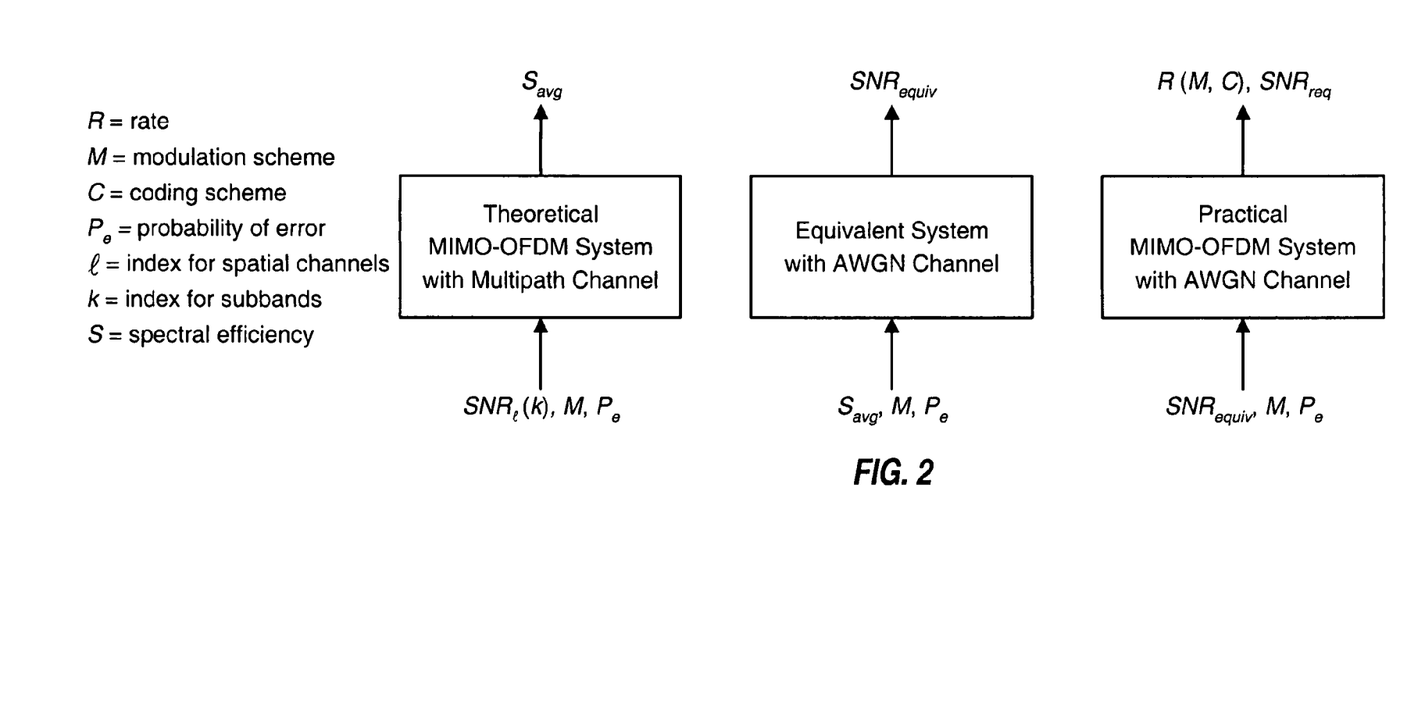
FIG. 2 illustrates rate selection for the MIMO-OFDM system.

FIG. 2 graphically illustrates a technique for performing rate selection for a MIMO-OFDM system with a multipath MIMO channel. For a given multipath MIMO channel defined by a channel response of H(k), for k=1 ... $N_F$, and a noise variance of $N_0$, a theoretical MIMO-OFDM system has an average constrained spectral efficiency of $S_{avg}$ with modulation scheme M. As used herein, a "theoretical" system is one without any losses, and a "practical" system is one with implementation losses (e.g., due to hardware imperfections), code loss due to the fact that practical codes do not work at capacity, and any other losses. The theoretical and practical systems both use one or more modulation schemes for data transmission and are defined by constrained spectral efficiencies. The average constrained spectral efficiency $S_{avg}$ may be determined as described below. In general, different modulation schemes may be used for different subbands and/or spatial channels. For simplicity, the following description assumes that the same modulation scheme M is used for all subbands of all spatial channels available for data transmission.

An equivalent system with an AWGN channel needs an SNR of $SNR_{equiv}$ to achieve a constrained spectral efficiency of $S_{avg}$ with modulation scheme M. This equivalent system also has no losses. The equivalent SNR may be derived as described below.

A practical MIMO-OFDM system with an AWGN channel requires an SNR of $SNR_{req}$ or better to support rate R, which is associated with modulation scheme M, coding scheme C, and data rate D. The data rate D is given in units of bps/Hertz/ch, which is the same unit used for spectral efficiency. The rate R may be selected as the highest rate supported by the system with a required SNR equal to or less than the equivalent SNR, as described below. The required SNR is dependent on modulation scheme M, coding scheme C, and other system losses. The required SNR may be determined for each supported rate (e.g., based on computer simulation, empirical measurement, or some other means) and stored in a look-up table.

A practical MIMO-OFDM system with a multipath MIMO channel (e.g., MIMO-OFDM system 100) is deemed to support rate R with modulation scheme M and coding scheme C if the required SNR is less than or equal to the equivalent SNR. As the rate increases, the required SNR increases for the practical system while the equivalent SNR is approximately constant since it is defined by the channel response H(k) and the noise variance $N_0$. The maximum rate that may be supported by the practical MIMO-OFDM system with the multipath MIMO channel is thus limited by the channel conditions. Details of the rate selection are described below.

An ideal system having an unconstrained spectral efficiency can be analyzed and used for rate selection for the practical system having a constrained spectral efficiency. An unconstrained spectral efficiency for each subband of the multipath MIMO channel may be determined based on an unconstrained MIMO spectral efficiency function, as follows:

$$S_{unconst}(k) = \frac{1}{N_T} \cdot \log_2[\det(\underline{I} + \underline{H}(k) \cdot \underline{\Gamma}(k) \cdot \underline{H}^H(k))], \quad \text{Eq (2)}$$

for $k = 1 \ldots N_F$, where det($\underline{M}$) denotes the determinant of $\underline{M}$, I is the identity matrix, $S_{unconst}(k)$ is the unconstrained spectral efficiency of H(k), $\Gamma$(k) is a matrix that determines the power used for the transmit antennas, and "$^H$" denotes a conjugate transpose. If the channel response H(k) is only known by the receiver, then $\Gamma$(k) is equal to the identity matrix (i.e., $\Gamma$(k)=I).

For a capacity achieving MIMO-OFDM system, which is a system that can transmit and receive data at the capacity of the MIMO channel assuming that a capacity achieving code is available for use, the unconstrained spectral efficiency for each subband of the MIMO channel may be determined based on an unconstrained SISO spectral efficiency function, as follows:

$$S_{unconst}(k) = \frac{1}{N_T} \cdot \sum_{l=1}^{N_T} \log_2[1 + SNR_l(k)], \quad \text{Eq (3)}$$

for $k = 1 \ldots N_F$, where $SNR_l(k)$ is the post-detection SNR for subband k of spatial channel l for the capacity achieving system. The post-detection SNR is the SNR achieved for a detected symbol stream after the receiver spatial processing to remove interference from the other symbol streams. The post-detection SNR in equation (3) may be obtained, for example, by a receiver that uses a successive interference cancellation (SIC) technique with a minimum mean square error (MMSE) detector, as described below. Equations (2) and (3) indicate that, for the capacity achieving system, the unconstrained spectral efficiency of the MIMO channel is equal to the sum of the unconstrained spectral efficiencies of the $N_T$ single-input single-output (SISO) channels that make up the MIMO channel. Each SISO channel corresponds to a spatial channel of the MIMO channel.

If a single data rate is used for data transmission on all $N_F$ subbands of all $N_T$ transmit antennas, then this single data rate may be set to the average unconstrained spectral efficiency for the $N_F$ subbands of the MIMO channel, as follows:

$$D_{unconst} = \frac{1}{N_F} \cdot \sum_{k=1}^{N_F} S_{unconst}(k). \quad \text{Eq (4)}$$

Substituting the unconstrained SISO spectral efficiency function in equation (3) into equation (4), the single data rate may be expressed as:

$$D_{unconst} = \frac{1}{N_F N_T} \cdot \sum_{k=1}^{N_F} \sum_{l=1}^{N_T} \log_2[1 + SNR_l(k)]. \qquad \text{Eq (5)}$$

The data rate $D_{unconst}$ is obtained based on the average unconstrained spectral efficiency and is suitable for the ideal MIMO-OFDM system, which is not restricted to a specific modulation scheme. The practical MIMO-OFDM system uses one or more specific modulation schemes for data transmission and has a constrained spectral efficiency that is less than the unconstrained capacity. The data rate $D_{unconst}$ derived based on equation (5) is an optimistic data rate for the practical MIMO-OFDM system. A more accurate data rate may be obtained for the practical MIMO-OFDM system based on a constrained capacity function, instead of an unconstrained capacity function, as described below.

Figure 3:
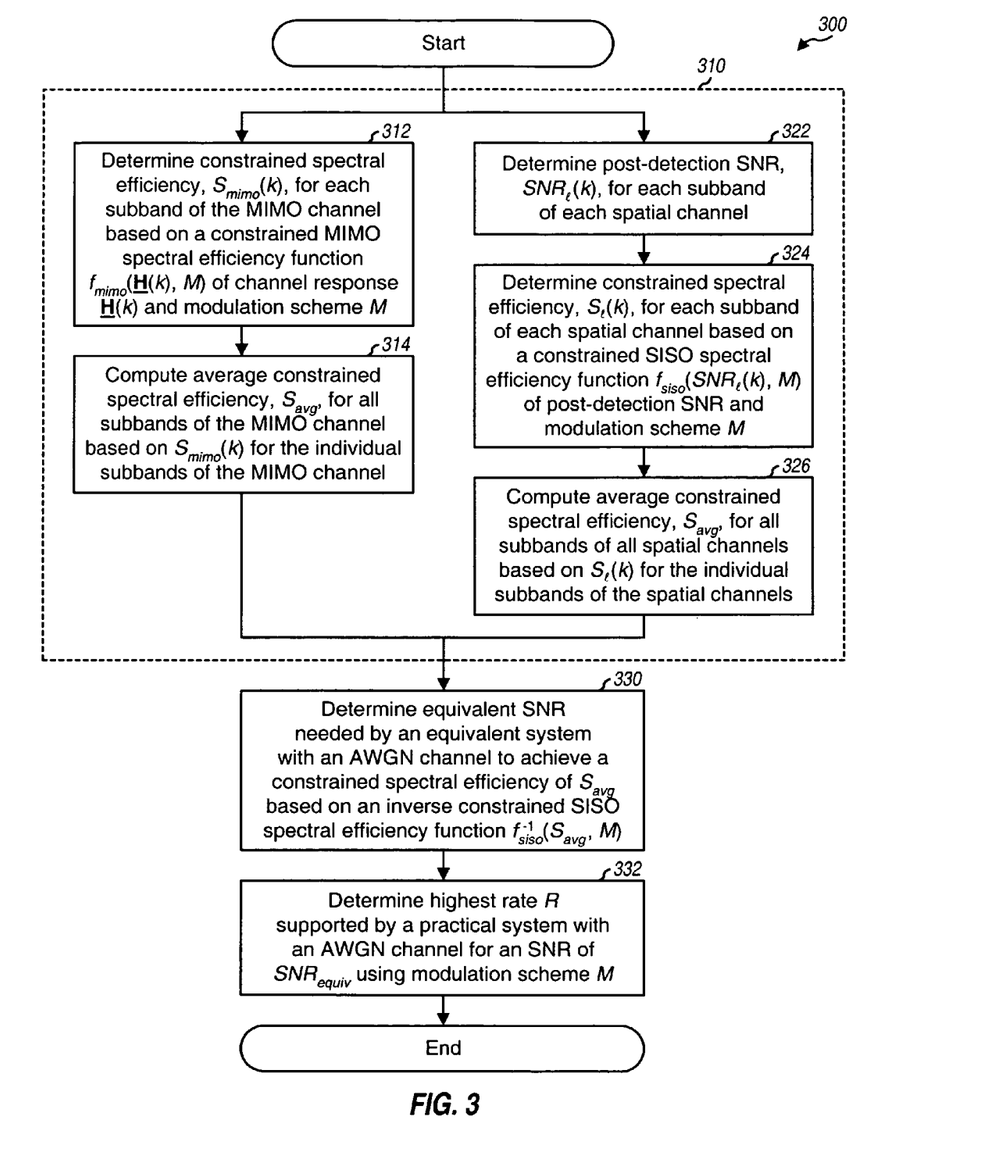
FIG. 3 shows a process for performing rate selection for a MIMO-OFDM system with a multipath MIMO channel; 1

FIG. 3 shows a process 300 for performing rate selection for a practical MIMO-OFDM system with a multipath MIMO channel. Process 300 may be performed by rate selector 174 or some other processing unit at the receiver. Initially, an average constrained spectral efficiency $S_{avg}$ for the MIMO channel is determined (block 310). This may be achieved in several ways.

If a constrained MIMO spectral efficiency function $f_{mimo}(H(k), M)$ is available, then the constrained spectral efficiency for each subband of the MIMO channel may be computed based on this function (block 312), as follows:

$$S_{mimo}(k) = \frac{1}{N_T} \cdot f_{mimo}(\underline{H}(k), M), \text{ for } k = 1 \dots N_F. \qquad \text{Eq (6)}$$

The average constrained spectral efficiency $S_{avg}$ for all subbands of the MIMO channel may then be computed (block 314), as follows:

$$S_{avg} = \frac{1}{N_F} \cdot \sum_{k=1}^{N_F} S_{mimo}(k). \qquad \text{Eq (7)}$$

The constrained MIMO spectral efficiency function $f_{mimo}(H(k), M)$ is likely to be a complex equation with no closed form solution or may not even be available. In this case, the MIMO channel may be decomposed into $N_T$ SISO channels, and the average constrained spectral efficiency $S_{avg}$ for the MIMO channel may be determined based on the constrained spectral efficiencies of the individual SISO channels. Since the unconstrained spectral efficiency of the MIMO channel is equal to the sum of the unconstrained spectral efficiencies of the $N_T$ SISO channels for a capacity achieving system, as described above, the constrained spectral efficiency of the MIMO channel can be assumed to be equal to the sum of the constrained spectral efficiencies of the $N_T$ SISO channels for the capacity achieving system.

To compute $S_{avg}$, the post-detection SNR $SNR_l(k)$ for each subband k of each spatial channel l may be determined for the capacity achieving system, as described below (block 322). The constrained spectral efficiency $S_l(k)$ for each subband of each spatial channel is then determined based on a constrained SISO spectral efficiency function $f_{siso}(SNR_l(k), M)$ (block 324), as follows:

$$S_l(k) = f_{siso}(SNR_l(k), M), \text{ for } k=1 \dots N_F \text{ and } l=1 \dots N_T. \qquad \text{Eq (8)}$$

The constrained SISO spectral efficiency function $f_{siso}(SNR_l(k), M)$ may be defined as:

$$f_{siso}(SNR_l(k), M) = B - \frac{1}{2^B} \sum_{i=1}^{2^B} E\left[\log_2 \sum_{j=1}^{2^B} \exp(-SNR_l(k) \cdot (|a_i - a_j|^2 + 2\operatorname{Re}\{\eta^*(a_i - a_j)\}))\right], \qquad \text{Eq (9)}$$

where B is the number of bits for each modulation symbol for modulation scheme M;

$a_i$ and $a_j$ are signal points in the $2^B$-ary constellation for modulation scheme M;

$\eta$ is a complex Gaussian random variable with zero mean and a variance of $1/SNR_l(k)$; and $E[\cdot]$ is an expectation operation taken with respect to $\eta$ in equation (9).

Modulation scheme M is associated with a $2^B$-ary constellation (e.g., $2^B$-ary QAM) that contains $2^B$ signal points. Each signal point in the constellation is labeled with a different B-bit value.

The constrained SISO spectral efficiency function shown in equation (9) does not have a closed form solution. This function may be numerically solved for various SNR values for each modulation scheme, and the results may be stored in a look-up table. Thereafter, the constrained SISO spectral efficiency function may be evaluated by accessing the look-up table with the modulation scheme M and the post-detection SNR $SNR_l(k)$.

The average constrained spectral efficiency $S_{avg}$ for all subbands of all spatial channels may then be computed (block 326), as follows:

$$S_{avg} = \frac{1}{N_F \cdot N_T} \cdot \sum_{k=1}^{N_F} \sum_{l=1}^{N_T} S_l(k). \qquad \text{Eq (10)}$$

The average constrained spectral efficiency $S_{avg}$ may be computed for a practical MIMO-OFDM system with a multipath MIMO channel in various manners. Two exemplary methods are described above. Other methods may also be used.

An equivalent system with an AWGN channel would require an SNR of $SNR_{equiv}$ to achieve a constrained spectral efficiency of $S_{avg}$ with modulation scheme M. The equivalent SNR may be determined based on an inverse constrained SISO spectral efficiency function $f_{siso}^{-1}(S_{avg}, M)$ (block 330). The constrained SISO spectral efficiency function $f_{siso}(x)$ takes two inputs, $SNR_l(k)$ and M, and maps them to a constrained spectral efficiency $S_l(k)$. Here, x represents the set of pertinent variables for the function. The inverse constrained SISO spectral efficiency function $f_{siso}^{-1}(x)$ takes two inputs, $S_{avg}$ and M, and maps them to an SNR value, as follows:

$$SNR_{equiv} = f_{siso}^{-1}(S_{avg}, M). \qquad \text{Eq (11)}$$

The inverse function $f_{siso}^{-1}(S_{avg}, M)$ may be determined once for each supported modulation scheme and stored in a look-up table.

The highest rate that may be used for data transmission in a practical MIMO-OFDM system with an AWGN channel is then determined based on the equivalent SNR for the equivalent system (block 332). The practical MIMO-OFDM system may support a set of P rates, $R=\{R(m), m=1, 2, \ldots P\}$, where m is a rate index. Only the P rates in set R are available for use for data transmission. Each rate R(m) in set R may be associated with a specific modulation scheme M(m), a specific code rate or coding scheme C(m), a specific data rate D(m), and a specific required SNR $SNR_{req}(m)$, as follows:

$$R(m) \Leftrightarrow [M(m), C(m), D(m), SNR_{req}(m)], \text{ for } m=1 \ldots P. \quad \text{Eq (12)}$$

For each rate R(m), the data rate D(m) is determined by the modulation scheme M(m) and the code rate C(m). For example, a rate associated with a modulation scheme of QPSK (with two bits per modulation symbol) and a code rate of ½ would have a data rate of 1.0 information bit per modulation symbol. Expression (12) states that data rate D(m) may be transmitted using modulation scheme M(m) and code rate C(m) and further requires an SNR of $SNR_{req}(m)$ or better to achieve a PER of $P_f$. The required SNR accounts for system losses in the practical system and may be determined by computer simulation, empirical measurements, and so on. The set of supported rates and their required SNRs may be stored in a look-up table. The equivalent SNR $SNR_{equiv}$ may be provided to the look-up table, which then returns the rate $R=R(m_s)$ associated with the highest data rate supported by $SNR_{equiv}$. The selected rate R is such that the following conditions are met: (1) modulation scheme M is used for data transmission, or $M(m_s)=M$, (2) the required SNR is less than or equal to the equivalent SNR, or $SNR_{req}(m_s) \leq SNR_{equiv}$, and (3) the maximum data rate is selected, or $$D_s = \max_m \{D(m)\},$$

subject to the other conditions. The selected rate R includes a back-off factor that accounts for loss due to the selected code rate $C(m_s)$, which may not be able to achieve capacity. This back off occurs in condition (2) above.

The data rate $D_s$ is indicative of the maximum data rate that can be transmitted on each subband of each spatial channel for a capacity achieving system. An aggregate data rate for all $N_T$ spatial channels may be computed, as follows:

$$D_{total} = D_s \cdot N_T. \quad \text{Eq (13)}$$

The aggregate data rate is given in units of bps/Hz, which is normalized to frequency. The factor of $N_F$ is thus not included in equation (13). The aggregate data rate represents a prediction of the data rate that can be supported by the practical MIMO-OFDM system with the multipath MIMO channel for the desired PER of $P_f$.

The rate selection technique described above assumes that the practical MIMO-OFDM system is capable of achieving capacity with modulation scheme M. Several transmission schemes that can achieve capacity are described below. The selected rate R may be an accurate rate for such a system and may be used for data transmission without any modification.

However, as with any rate prediction scheme, there will inevitably be errors in the rate prediction. Moreover, the practical system may not be able to achieve capacity and/or may have other losses that are unaccounted for by the selected rate R. In this case, to ensure that the desired PER can be achieved, errors in the rate prediction may be estimated and an additional back-off factor may be derived. The rate obtained in block 332 may then be reduced by the additional back-off factor to obtain a final rate for data transmission via the multipath MIMO channel. Alternatively, the average constrained spectral efficiency $S_{avg}$ may be reduced by the additional back-off factor, and the reduced average constrained spectral efficiency may be provided to the look-up table to obtain the rate for data transmission. In any case, the additional back-off factor reduces the throughput of the system. Thus, it is desirable to keep this back-off factor as small as possible while still achieving the desired PER. An accurate rate prediction scheme, such as the one described herein, may minimize the amount of additional back off to apply and hence maximize system capacity.

The rate selection described above may be performed continually for each time interval, which may be of any duration (e.g., one OFDM symbol period). It is desirable to use the selected rate for data transmission as soon as possible to minimize the amount of time between the selection of the rate and the use of the rate.

Figure 4A:
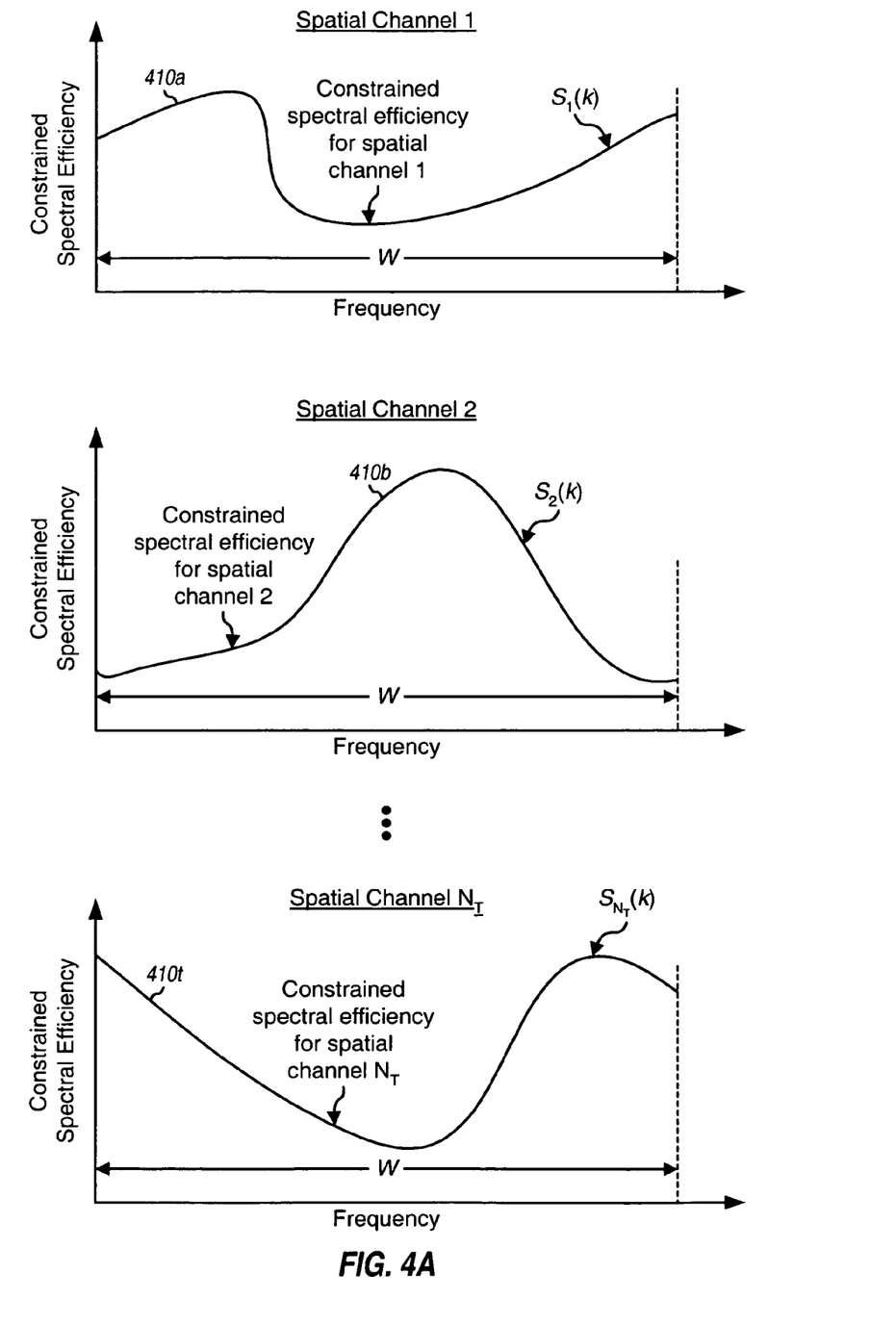
FIG. 4A illustrates constrained spectral efficiencies for NT spatial channels in the MIMO-OFDM system with the multipath MIMO channel.

FIG. 4A illustrates the constrained spectral efficiencies for the $N_T$ spatial channels in the MIMO-OFDM system with the multipath MIMO channel. For each spatial channel, a plot 410 of the constrained spectral efficiencies for the $N_F$ subbands may be derived based on the post-detection SNRs, the modulation scheme M, and the constrained SISO spectral efficiency function $f_{siso}(SNR_i(k), M)$, as shown in equations (8) and (9). Plots 410a through 410t for the $N_T$ spatial channels may be different because of different fading for these spatial channels, as shown in FIG. 4A.

Figure 4B:
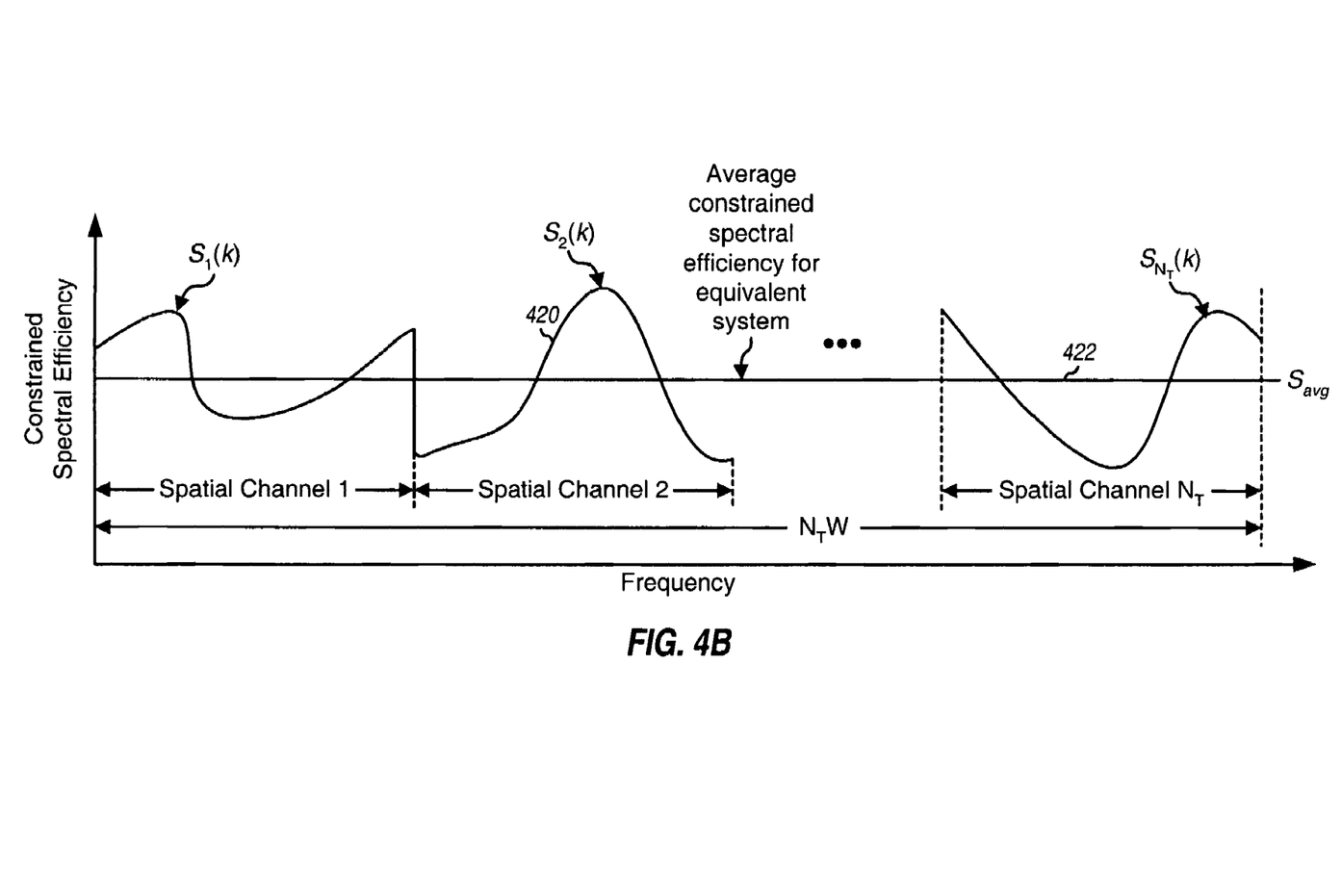
FIG. 4B illustrates constrained spectral efficiency for an equivalent system with an AWGN channel.

FIG. 4B illustrates the constrained spectral efficiency of the equivalent system with the AWGN channel. A plot 420 is formed by concatenation of plots 410a through 410t for the $N_T$ spatial channels in FIG. 4A. A plot 422 shows the constrained spectral efficiency for the equivalent system, which is the average of the constrained spectral efficiencies for plots 410a through 410t.

The rate selection described above includes a back-off factor for code loss but otherwise assumes that the MIMO-OFDM system can achieve capacity. Two exemplary transmission schemes capable of achieving capacity are described below.

In a first transmission scheme, the transmitter transmits data on "eigenmodes" of the MIMO channel. The eigenmodes may be viewed as orthogonal spatial channels obtained by decomposing the MIMO channel. The channel response matrix H(k) for each subband may be decomposed using eigenvalue decomposition, as follows:

$$\underline{R}(k) = \underline{H}^H(k) \cdot \underline{H}(k) = \underline{E}(k) \cdot \Lambda(k) \cdot \underline{E}^H(k), \text{ for } k=1 \ldots N_F. \quad \text{Eq (14)}$$

where $\underline{R}(k)$ is an $N_T \times N_T$ correlation matrix of H(k);

$\underline{E}(k)$ is an $N_T \times N_T$ unitary matrix whose columns are eigenvectors of $\underline{R}(k)$; and $\Lambda(k)$ is an $N_T \times N_T$ diagonal matrix of eigenvalues of $\underline{R}(k)$.

A unitary matrix U is characterized by the property $U^H \cdot U = I$. The columns of a unitary matrix are orthogonal to one another.

The transmitter performs spatial processing as follows:

$$\underline{x}(k) = \underline{E}(k) \cdot \underline{s}(k), \text{ for } k=1 \ldots N_F, \quad \text{Eq (15)}$$

where $\underline{s}(k)$ is an $N_T \times 1$ vector with $N_T$ data symbols to be sent on the $N_T$ eigenmodes of subband k; and $\underline{x}(k)$ is an $N_T \times 1$ vector with $N_T$ transmit symbols to be transmitted from the $N_T$ transmit antennas on subband k. The received symbols at the receiver may be expressed as:

$$r_{em}(k)=H(k)\cdot \underline{x}(k)+n(k), \text{ for } k=1\ldots N_F, \quad \text{Eq (16)}$$

where $r_{em}(k)$ is an $N_R \times 1$ vector with $N_R$ received symbols obtained via the $N_R$ receive antennas on subband k; and n is an $N_R \times 1$ vector of noise and interference for subband k.

The noise vector n(k) is assumed to have zero mean and a covariance matrix of $\Lambda_n(k)=N_0 \cdot I$, where $N_0$ is the noise variance.

The receiver performs receiver spatial processing/detection, as follows:

$$\underline{\hat{s}}_{em}(k)=\Lambda^{-1}(k)\cdot \underline{E}^H(k)\cdot H^H(k)\cdot r_{em}(k)=\underline{s}(k)+n_{em}(k), \quad k=1\ldots N_F, \quad \text{Eq (17)}$$

where $\underline{\hat{s}}_{em}(k)$ is an $N_T \times 1$ vector with $N_T$ detected symbols for subband k, which are estimates of the $N_T$ data symbols in $\underline{s}(k)$; and $n_{em}(k)=\Lambda^{-1}(k)\cdot \underline{E}^H(k)\cdot H^H(k)\cdot n(k)$ is the post-detection interference and noise after the spatial processing at the receiver.

Each eigenmode is an effective channel between an element of the data symbol vector $\underline{s}(k)$ and a corresponding element of the detected symbol vector $\underline{\hat{s}}_{em}(k)$.

The SNR for each subband of each eigenmode may be expressed as:

$$SNR_{em,l}(k) = \frac{P_l(k)\cdot \lambda_l(k)}{N_0}, \quad \text{Eq (18)}$$

for $k = 1 \ldots N_F$ and $l = 1 \ldots N_T$, where $P_l(k)$ is the transmit power used for eigenmode l of subband k;

$\lambda_l(k)$ is the eigenvalue for eigenmode l of subband k, which is the l-th diagonal element of $\Lambda(k)$; and $SNR_{em,l}(k)$ is the post-detection SNR for eigenmode l of subband k.

In a second transmission scheme, the transmitter encodes and modulates data to obtain data symbols, demultiplexes the data symbols into $N_T$ data symbol streams, and transmits the $N_T$ data symbol streams simultaneously from the $N_T$ transmit antennas. The received symbols at the receiver may be expressed as:

$$r_{ant}(k)=H(k)\cdot \underline{s}(k)+n(k), \text{ for } k=1\ldots N_F. \quad \text{Eq (19)}$$

The receiver performs receiver spatial processing/detection on the $N_R$ received symbols for each subband to recover the $N_T$ data symbols transmitted on that subband. The receiver spatial processing may be performed with a minimum mean square error (MMSE) detector, a maximal ratio combining (MRC) detector, a linear zero-forcing (ZF) detector, an MMSE linear equalizer (MMSE-LE), a decision feedback equalizer (DFE), or some other detector/equalizer.

The receiver may also process the $N_R$ received symbol streams using a successive interference cancellation (SIC) technique to recover the $N_T$ data symbol streams. The SIC technique may be used when the transmitter independently processes the $N_T$ data symbol streams so that the receiver can individually recover each data symbol stream. The receiver recovers the $N_T$ data symbol streams in $N_T$ successive stages, one data symbol stream in each stage.

For the first stage, the receiver initially performs receiver spatial processing/detection on the $N_R$ received symbol streams (e.g., using an MMSE, MRC, or zero-forcing detector) and obtains one detected symbol stream. The receiver further demodulates, deinterleaves, and decodes the detected symbol stream to obtain a decoded data stream. The receiver then estimates the interference this decoded data stream causes to the other $N_T-1$ data symbol streams not yet recovered, cancels the estimated interference from the $N_R$ received symbol streams, and obtains $N_R$ modified symbol streams for the next stage. The receiver then repeats the same processing on the $N_R$ modified symbol streams to recover another data symbol stream. For simplicity, the following description assumes that the $N_T$ data symbol streams are recovered in sequential order, i.e., data symbol stream $\{s_l(k)\}$ sent from transmit antenna l is recovered in the l-th stage, for $l=1\ldots N_T$.

For a SIC with MMSE receiver, an MMSE detector is derived for each subband of stage l, for $l=1\ldots N_T$, as follows:

$$W_{mmse,l}(k)=(H_l(k)\cdot H_l^H(k)+N_0 \cdot I)^{-1}\cdot H_l(k), \text{ for } k=1\ldots N_F, \quad (20)$$

where $W_{mmse,l}(k)$ is an $N_R \times (N_T-l+1)$ matrix for the MMSE detector for subband k in stage l; and $H_l(k)$ is an $N_R \times (N_T-l+1)$ reduced channel response matrix for subband k in stage l.

The reduced channel response matrix $H_l(k)$ is obtained by removing l-1 columns in the original matrix H(k) corresponding to the l-1 data symbol streams already recovered in the l-1 prior stages.

The receiver performs detection for each subband in stage l, as follows:

$$\hat{s}_{mmse,l}(k)=w_{mmse,l}^H(k)\cdot r_l(k)=s_l(k)+w_{mmse,l}^H(k)\cdot n_l(k), \quad \text{Eq (21)}$$

where $w_{mmse,l}(k)$ is a column of $W_{mmse,l}(k)$ corresponding to transmit antenna l;

$\hat{s}_{mmse,l}(k)$ is the MMSE detected symbol for subband k in stage l; and $w_{mmse,l}^H(k)\cdot n_l(k)$ is the post-detection noise for the detected symbol $\hat{s}_{mmse,l}(k)$.

The SNR for each subband of each transmit antenna may be expressed as:

$$SNR_{mmse,l}(k) = \frac{P_l(k)}{N_0 \cdot \|\underline{w}_{mmse,l}(k)\|^2}, \quad \text{Eq (22)}$$

where $N_0 \cdot \|\underline{w}_{mmse,l}(k)\|^2$ is the variance of the post-detection noise; and $SNR_{mmse,l}(k)$ is the post-detection SNR for subband k of transmit antenna l.

The post-detection SNRs for later stages improve because the norm of $w_{mmse,l}(k)$ in equation (22) decreases with each stage.

The SIC technique is described in further detail in commonly assigned U.S. patent application Ser. No. 09/993,087, entitled "Multiple-Access Multiple-Input Multiple-Output (MIMO) Communication System," filed Nov. 6, 2001.

For the second transmission scheme, the receiver can also recover the $N_T$ data symbol streams using an iterative detection and decoding (IDD) scheme. For the IDD scheme, whenever a block of received symbols for a data packet is obtained, the receiver iteratively performs detection and decoding multiple ($N_{dec}$) times on the received symbols in the block to obtain a decoded packet. A detector performs detection on the received symbol block and provides a detected symbol block. A decoder performs decoding on the detected symbol block and provides decoder a priori information, which is used by the detector in a subsequent iteration. The decoded packet is generated based on decoder output for the last iteration.

It can be shown that the first transmission scheme and the second transmission scheme with either the SIC with MMSE receiver or the IDD receiver are optimal and can achieve capacity or near capacity for the MIMO-OFDM system. The second transmission scheme with a maximum likelihood detector for the received symbols can also provide optimal or near optimal performance. Other capacity achieving transmission schemes may also be used for the MIMO-OFDM system. One such capacity achieving transmission scheme is an autocoding scheme described by T. L. Marzetta et al. in a paper entitled "Structured Unitary Space-Time Autocoding Constellations," IEEE Transaction on Information Theory, Vol. 48, No. 4, April 2002.

Figure 5:
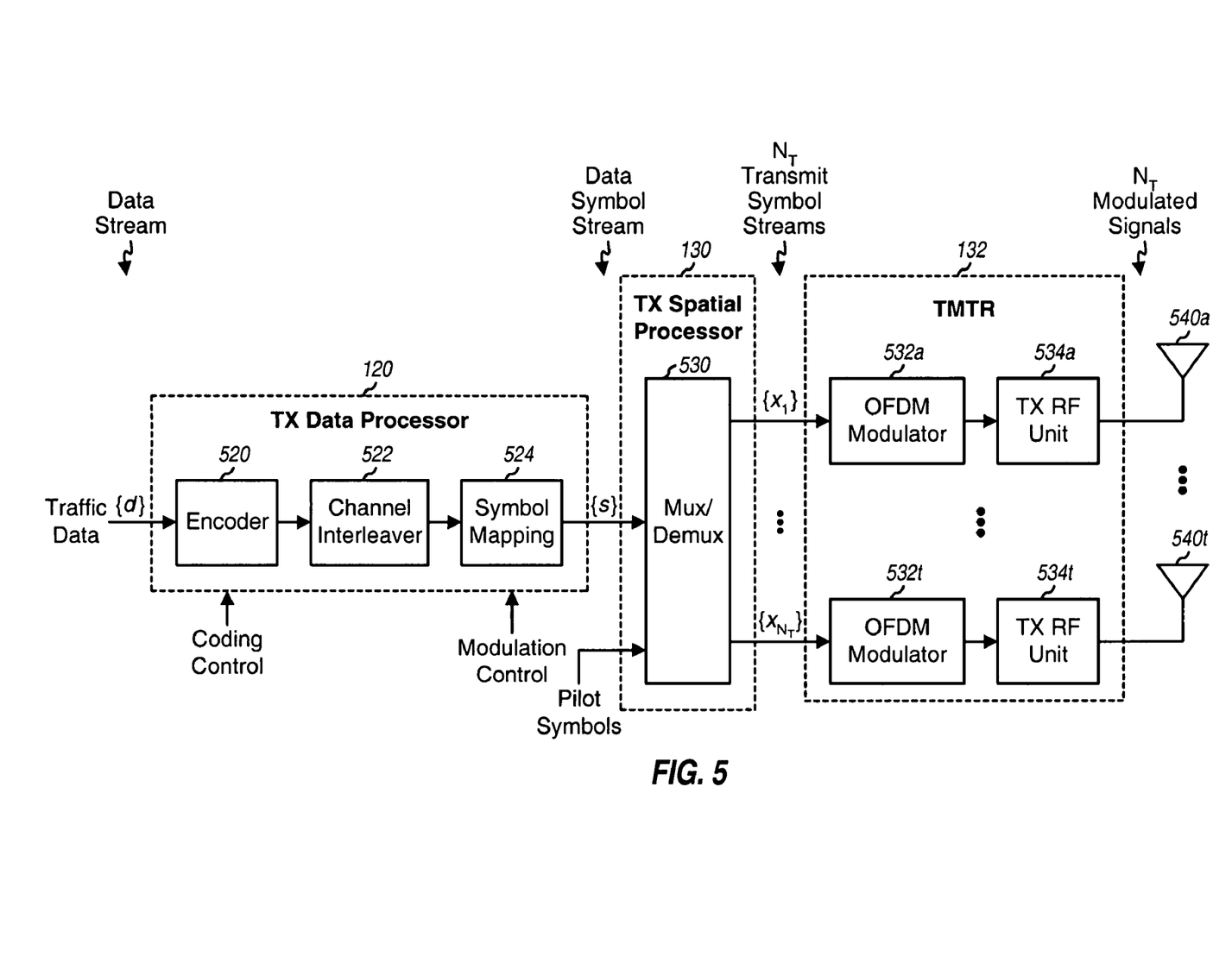
FIG. 5 shows a block diagram of the transmitter.

FIG. 5 shows a block diagram of transmitter 110. Within TX data processor 120, an encoder 520 receives and encodes a data stream {d} in accordance with coding scheme C for the selected rate R and provides code bits. The encoding increases the reliability of the data transmission. The coding scheme may include a convolutional code, a Turbo code, a block code, a CRC code, or a combination thereof. A channel interleaver 522 interleaves (i.e., reorders) the code bits from encoder 520 based on an interleaving scheme. The interleaving provides time and/or frequency diversity for the code bits. A symbol mapping unit 524 modulates (i.e., symbol maps) the interleaved data from channel interleaver 522 in accordance with modulation scheme M for the selected rate R and provides data symbols. The modulation may be achieved by (1) grouping sets of B interleaved bits to form B-bit binary values, where $B \geq 1$, and (2) mapping each B-bit binary value to a specific signal point in a signal constellation for the modulation scheme. Symbol mapping unit 524 provides a stream of data symbols {s}.

Transmitter 110 encodes and modulates each data packet separately based on the rate R selected for the packet to obtain a corresponding data symbol block. Transmitter 110 may transmit one data symbol block at a time on all subbands of all spatial channels available for data transmission. Each data symbol block may be transmitted in one or multiple OFDM symbol periods. Transmitter 110 may also transmit multiple data symbol blocks simultaneously on the available subbands and spatial channels. If one rate is selected for each time interval, as described above, then all data symbol block(s) transmitted in the same time interval use the same selected rate.

For the embodiment shown in FIG. 5, TX spatial processor 130 implements the second transmission scheme described above. Within TX spatial processor 130, a multiplexer/demultiplexer (Mux/Demux) 530 receives and demultiplexes the data symbol stream {s} into $N_T$ streams for the $N_T$ transmit antennas. Mux/demux 530 also multiplexes in pilot symbols (e.g., in a time division multiplex (TDM) manner) and provides $N_T$ transmit symbol streams, $\{x_1\}$ through $\{x_{N_T}\}$, for the $N_T$ transmit antennas. Each transmit symbol may be a data symbol, a pilot symbol, or a signal value of zero for a subband not used for data or pilot transmission.

Transmitter unit 132 includes $N_T$ OFDM modulators 532a through 532t and $N_T$ TX RF units 534a through 534t for the $N_T$ transmit antennas. Each OFDM modulator 532 performs OFDM modulation on a respective transmit symbol stream by (1) grouping and transforming each set of $N_F$ transmit symbols for the $N_F$ subbands to the time domain using an $N_F$-point IFFT to obtain a corresponding transformed symbol that contains $N_F$ chips and (2) repeating a portion (or $N_{cp}$ chips) of each transformed symbol to obtain a corresponding OFDM symbol that contains $N_F+N_{cp}$ chips. The repeated portion is referred to as a cyclic prefix, which ensures that the OFDM symbol retains its orthogonal properties in the presence of delay spread in a multipath channel. Each OFDM modulator 532 provides a stream of OFDM symbols, which is further conditioned (e.g., converted to analog, frequency upconverted, filtered, and amplified) by an associated TX RF unit 534 to generate a modulated signal. The $N_T$ modulated signals from TX RF units 534a through 534t are transmitted from $N_T$ antennas 540a through 540t, respectively.

Figure 6:
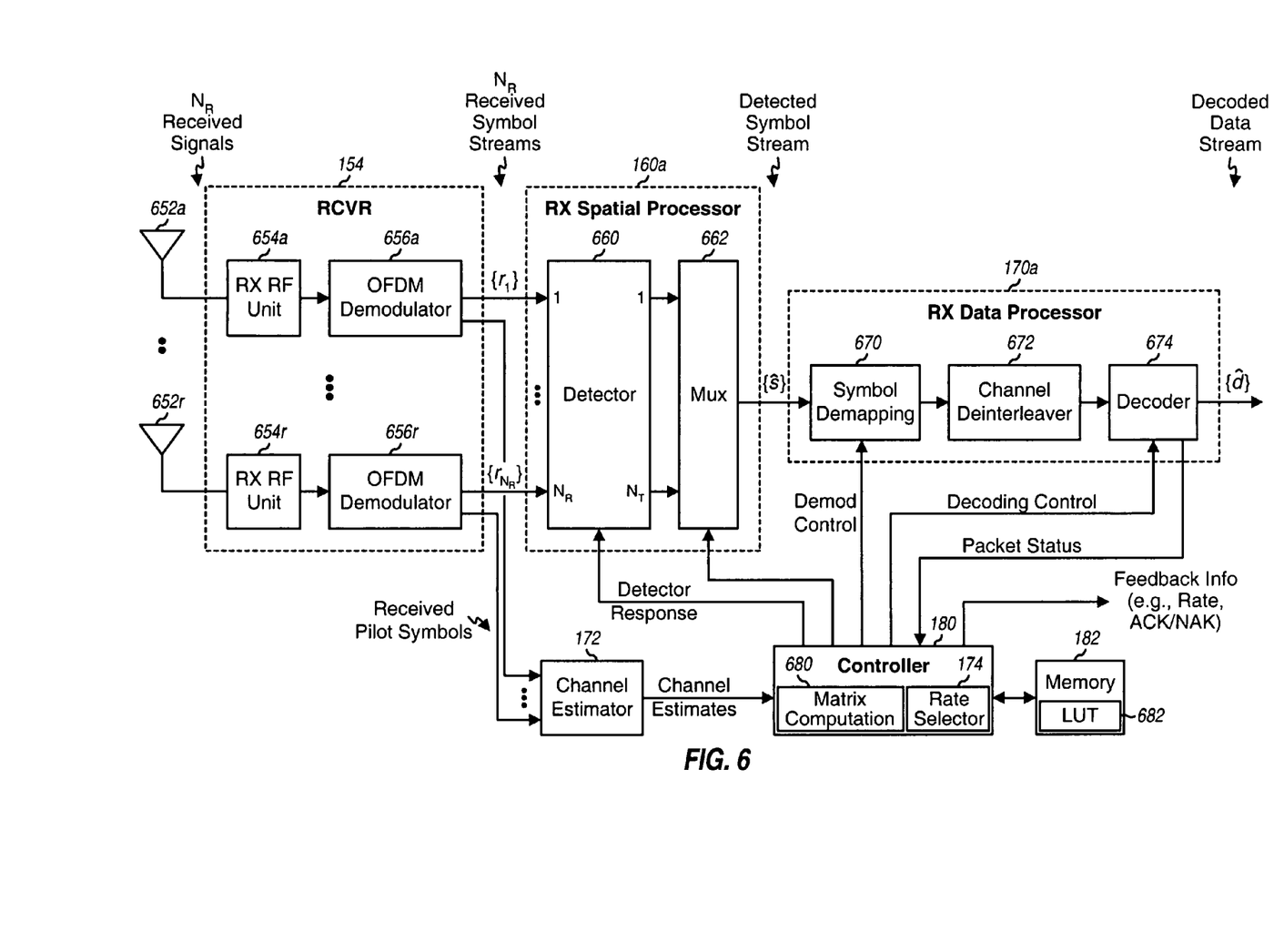
FIG. 6 shows a block diagram of the receiver.

FIG. 6 shows a block diagram of receiver 150. $N_R$ receive antennas 652a through 652r receive the modulated signals transmitted by transmitter 110 and provide $N_R$ received signals to receiver unit 154. Receiver unit 154 includes $N_R$ RX RF units 654a through 654r and $N_R$ OFDM demodulators 656a through 656r for the $N_R$ receive antennas. Each RX RF unit 654 conditions and digitizes a respective received signal and provides a stream of samples. Each OFDM demodulator 656 performs OFDM demodulation on a respective sample stream by (1) removing the cyclic prefix in each received OFDM symbol to obtain a received transformed symbol and (2) transforming each received transformed symbol to the frequency domain with an $N_F$-point FFT to obtain $N_F$ received symbols for the $N_F$ subbands. Each OFDM demodulator 656 provides received data symbols to RX spatial processor 160 and received pilot symbols to channel estimator 172.

FIG. 6 also shows an RX spatial processor 160a and an RX data processor 170a, which are one embodiment of RX spatial processor 160 and RX data processor 170, respectively, at receiver 150. Within RX spatial processor 160a, a detector 660 performs spatial processing/detection on the $N_R$ received symbol streams to obtain $N_T$ detected symbol streams. Each detected symbol is an estimate of a data symbol transmitted by the transmitter. Detector 660 may implement an MMSE, MRC, or zero-forcing detector. The detection is performed for each subband based on a matched filter matrix (or detector response) W(k) for that subband, which is derived based on an estimate of the channel response matrix H(k) for the subband. For example, the matched filter matrix for the MMSE detector may be derived as: $W_{mmse}(k)=(H(k) \cdot H^H(k)+N_0 \cdot I)^{-1} \cdot H(k)$. A multiplexer 662 multiplexes the detected symbols and provides a detected symbol stream {ŝ} to RX data processor 170a.

Within RX data processor 170a, a symbol demapping unit 670 demodulates the detected symbols in accordance with the modulation scheme M for the selected rate R and provides demodulated data. A channel deinterleaver 672 deinterleaves the demodulated data in a manner complementary to the interleaving performed at the transmitter and provides deinterleaved data. A decoder 674 decodes the deinterleaved data in a manner complementary to the encoding performed at the transmitter and provides a decoded data stream {d̂}. For example, decoder 674 may implement a Turbo decoder or a Viterbi decoder if Turbo or convolutional coding, respectively, is performed at the transmitter. Decoder 674 also provides the status of each decoded packet, which indicates whether the packet is decoded correctly or in error.

Figure 7:
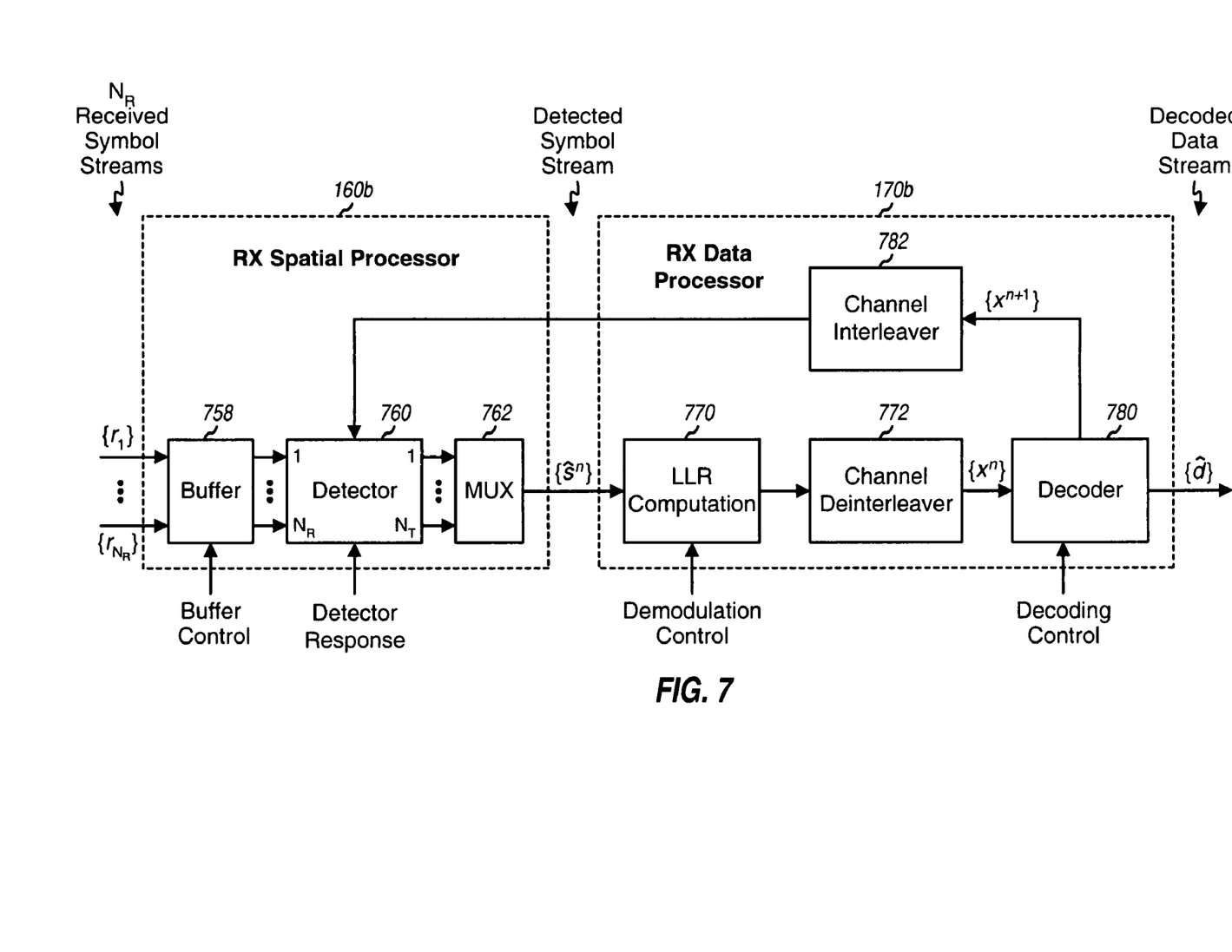
FIG. 7 shows a receive (RX) spatial processor and an RX data processor that implement iterative detection and decoding (IDD).

FIG. 7 shows an RX spatial processor 160b and an RX data processor 170b, which implement the IDD scheme and are another embodiment of RX spatial processor 160 and RX data processor 170, respectively, at receiver 150. A detector 760 and a decoder 780 perform iterative detection and decoding on the received symbols for each data packet to obtain a decoded packet. The IDD scheme exploits the error correction capabilities of the channel code to provide improved performance. This is achieved by iteratively passing a priori information between detector 760 and decoder 780 for $N_{dec}$ iterations, where $N_{dec}>1$. The a priori information indicates the likelihood of each transmitted data bit being zero or one.

Within RX spatial processor 160*b*, a buffer 758 receives and stores $N_R$ received symbol sequences from the $N_R$ receive antennas for each data packet. The iterative detection and decoding process is performed on each block of received symbols for a data packet. Detector 760 performs spatial processing on the $N_R$ received symbol sequences for each block and provides $N_T$ detected symbol sequences for the block. Detector 760 may implement an MMSE, MRC, or zero-forcing detector. A multiplexer 762 multiplexes the detected symbols in the $N_T$ sequences and provides a detected symbol block.

Within RX data processor 170*b*, a log-likelihood ratio (LLR) computation unit 770 receives the detected symbols from RX spatial processor 160*b* and computes the LLRs for the B code bits of each detected symbol. These LLRs represent a priori information provided by detector 760 to decoder 780. A channel deinterleaver 772 deinterleaves each block of LLRs from LLR computation unit 770 and provides deinterleaved LLRs $\{x^n\}$ for the block. Decoder 780 decodes the deinterleaved LLRs and provides decoder LLRs $\{x^{n+1}\}$, which represent a priori information provided by decoder 780 to detector 760. The decoder LLRs are interleaved by a channel interleaver 782 and provided to detector 760.

The detection and decoding process is then repeated for another iteration. Detector 760 derives new detected symbols based on the received symbols and the decoder LLRs. The new detected symbols are again decoded by decoder 780. The detection and decoding process is iterated $N_{dec}$ times. During the iterative detection and decoding process, the reliability of the detected symbols improves with each detection/decoding iteration. After all $N_{dec}$ detection/decoding iterations have been completed, decoder 780 computes the final data bit LLRs and slices these LLRs to obtain the decoded packet.

The IDD scheme is described in further detail in commonly assigned U.S. Patent Application Ser. No. 60/506,466, entitled "Hierarchical Coding With Multiple Antennas in a Wireless Communication System," filed Sep. 25, 2003.

The rate selection and data transmission techniques described herein may be implemented by various means. For example, these techniques may be implemented in hardware, software, or a combination thereof. For a hardware implementation, the processing units used to perform rate selection and data transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the rate selection and data transmission techniques may be implemented with modules (e.g., procedures, functions, and so on) that perform the functions described herein. The software codes may be stored in a memory unit (e.g., memory unit 182 or 142 in FIG. 1) and executed by a processor (e.g., controller 180 or 140). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of selecting a rate for data transmission in a multi-carrier multiple-input multiple-output (MIMO) communication system, comprising:
   determining an average constrained spectral efficiency for a plurality of subbands of a plurality of spatial channels used for data transmission, the plurality of spatial channels being formed by a MIMO channel in the system;
   determining an equivalent signal-to-noise-and-interference ratio (SNR) needed by an equivalent system with an additive white Gaussian noise (AWGN) channel to support the average constrained spectral efficiency; and
   selecting the rate for data transmission in the multi-carrier MIMO system based on the equivalent SNR.

2. The method of claim 1, wherein the average constrained spectral efficiency, the equivalent SNR, and the rate are all determined based on a specific modulation scheme.

3. The method of claim 1, wherein the plurality of subbands are obtained with orthogonal frequency division multiplexing (OFDM).

4. The method of claim 1, wherein the plurality of spatial channels correspond to a plurality of single-input single-output (SISO) channels that make up the MIMO channel.

5. The method of claim 1, further comprising:
   determining a post-detection SNR for each subband of each spatial channel used for data transmission; and
   determining a constrained spectral efficiency for each subband of each spatial channel based on the post-detection SNR for the subband of the spatial channel, and
   wherein the average constrained spectral efficiency is determined based on constrained spectral efficiencies for the plurality of subbands of the plurality of spatial channels.

6. The method of claim 5, wherein the post-detection SNR for each subband of each spatial channel is determined based on a transmission scheme capable of achieving capacity of the MIMO channel.

7. The method of claim 5, wherein the post-detection SNR for each subband of each spatial channel is determined based on successive interference cancellation (SIC) processing with a minimum mean square error (MMSE) detector at a receiver.

8. The method of claim 5, wherein the constrained spectral efficiency for each subband of each spatial channel is further determined based on a constrained spectral efficiency function having an SNR and a modulation scheme as inputs and providing a constrained spectral efficiency as output.

9. The method of claim 1, further comprising:
   determining a constrained spectral efficiency for each subband of the MIMO channel based on a constrained spectral efficiency function having a MIMO channel response and a modulation scheme as inputs and providing a constrained spectral efficiency as output, and
   wherein the average constrained spectral efficiency for the plurality of subbands of the plurality of spatial channels used for data transmission is determined based on constrained spectral efficiencies for the plurality of subbands of the MIMO channel.

10. The method of claim 1, wherein the equivalent SNR is determined based on an inverse constrained spectral efficiency function having a spectral efficiency and a modulation scheme as inputs and providing an SNR as output.

11. The method of claim 1, wherein the rate for data transmission is selected based on a set of rates supported by the multi-carrier MIMO system and required SNRs for the supported rates.

12. The method of claim 11, wherein the selected rate is a highest rate among the supported rates having a required SNR less than or equal to the equivalent SNR.

13. The method of claim 11, wherein the required SNRs for the supported rates include losses observed by the multi-carrier MIMO system.

14. The method of claim 1, further comprising:
determining a back-off factor to account for error in rate prediction and system losses; and
reducing the rate for data transmission based on the back-off factor.

15. The method of claim 1, further comprising:
receiving a data transmission at the selected rate, wherein the received data transmission includes at least one block of data symbols for at least one data packet, and wherein the data symbols in each block are transmitted simultaneously on the plurality of subbands of the plurality of spatial channels used for data transmission.

16. The method of claim 1, further comprising:
receiving a data transmission at the selected rate; and
performing iterative detection and decoding (IDD) to recover data in the received data transmission.

17. An apparatus in a multi-carrier multiple-input multiple-output (MIMO) communication system, comprising:
a channel estimator operative to obtain channel estimates for a MIMO channel in the system; and
a controller operative to
determine an average constrained spectral efficiency for a plurality of subbands of a plurality of spatial channels used for data transmission based on the channel estimates, wherein the plurality of spatial channels are formed by the MIMO channel,
determine an equivalent signal-to-noise-and-interference ratio (SNR) needed by an equivalent system with an additive white Gaussian noise (AWGN) channel to support the average constrained spectral efficiency, and
select a rate for data transmission in the multi-carrier MIMO system based on the equivalent SNR.

18. The apparatus of claim 17, wherein the controller is further operative to
determine a post-detection SNR for each subband of each spatial channel used for data transmission based on the channel estimates, and
determine a constrained spectral efficiency for each subband of each spatial channel based on the post-detection SNR for the subband of the spatial channel, and wherein the average constrained spectral efficiency is determined based on constrained spectral efficiencies for the plurality of subbands of the plurality of spatial channels.

19. The apparatus of claim 18, wherein the post-detection SNR for each subband of each spatial channel is further determined based on a transmission scheme capable of achieving capacity of the MIMO channel.

20. The apparatus of claim 17, wherein a set of rates is supported by the multi-carrier MIMO system and each supported rate is associated with a respective required SNR, and wherein the controller is further operative to select a highest rate among the supported rates having a required SNR less than or equal to the equivalent SNR.

21. The apparatus of claim 17, wherein the controller is further operative to determine a back-off factor to account for error in rate prediction and system losses and to reduce the rate for data transmission based on the back-off factor.

22. The apparatus of claim 17, further comprising:
a receive spatial processor operative to perform detection on received symbols for a data transmission at the selected rate and provide detected symbols; and
a receive data processor operative to process the detected symbols to obtain decoded data.

23. The apparatus of claim 22, wherein the receive spatial processor and the receive data processor are operative to perform iterative detection and decoding (IDD) to obtain the decoded data from the received symbols.

24. An apparatus in a multi-carrier multiple-input multiple-output (MIMO) communication system, comprising:
means for determining an average constrained spectral efficiency for a plurality of subbands of a plurality of spatial channels used for data transmission, the plurality of spatial channels being formed by a MIMO channel in the system;
means for determining an equivalent signal-to-noise-and-interference ratio (SNR) needed by an equivalent system with an additive white Gaussian noise (AWGN) channel to support the average constrained spectral efficiency; and
means for selecting a rate for data transmission in the multi-carrier MIMO system based on the equivalent SNR.

25. The apparatus of claim 24, further comprising:
means for determining a post-detection SNR for each subband of each spatial channel used for data transmission; and
means for determining a constrained spectral efficiency for each subband of each spatial channel based on the post-detection SNR for the subband of the spatial channel, and wherein the average constrained spectral efficiency is determined based on constrained spectral efficiencies for the plurality of subbands of the plurality of spatial channels.

26. The apparatus of claim 24, further comprising:
means for determining a back-off factor to account for error in rate prediction and system losses; and
means for reducing the rate for data transmission based on the back-off factor.

27. The apparatus of claim 24, further comprising:
means for receiving a data transmission at the selected rate; and
means for performing iterative detection and decoding (IDD) to recover data in the received data transmission.

28. A processor readable media for storing software codes operable in an apparatus to:
determine an average constrained spectral efficiency for a plurality of subbands of a plurality of spatial channels used for data transmission in a multi-carrier multiple-input multiple-output (MIMO) communication system, the plurality of spatial channels being formed by a MIMO channel in the system;
determine an equivalent signal-to-noise-and-interference ratio (SNR) needed by an equivalent system with an additive white Gaussian noise (AWGN) channel to support the average constrained spectral efficiency; and
select a rate for data transmission in the multi-carrier MIMO system based on the equivalent SNR.

29. The processor readable media of claim 28 and further for storing software codes operable to
determine a post-detection SNR for each subband of each spatial channel used for data transmission; and determine a constrained spectral efficiency for each subband of each spatial channel based on the post-detection SNR for the subband of the spatial channel, and wherein the average constrained spectral efficiency is determined based on constrained spectral efficiencies for the plurality of subbands of the plurality of spatial channels.

* * * * *